US012085189B2

(12) United States Patent
Haldeman et al.

(10) Patent No.: US 12,085,189 B2
(45) Date of Patent: Sep. 10, 2024

(54) VALVE POSITION MONITOR, AND SYSTEMS AND METHODS OF USING SAME

(71) Applicant: WASHINGTON SUBURBAN SANITARY COMMISSION, Laurel, MD (US)

(72) Inventors: James Haldeman, Poolesville, MD (US); Roland Kamdem, Laurel, MD (US)

(73) Assignee: Washington Suburban Sanitary Commission, Laurel, MD (US)

( * ) Notice: Subject to any disclaimer, the term of this patent is extended or adjusted under 35 U.S.C. 154(b) by 153 days.

(21) Appl. No.: 15/931,175

(22) Filed: May 13, 2020

(65) Prior Publication Data

US 2020/0362987 A1 Nov. 19, 2020

Related U.S. Application Data

(60) Provisional application No. 62/847,380, filed on May 14, 2019.

(51) Int. Cl.
*F16K 37/00* (2006.01)
*F16K 1/22* (2006.01)
*G01D 5/14* (2006.01)
*H04W 4/38* (2018.01)

(52) U.S. Cl.
CPC ............ *F16K 37/0041* (2013.01); *F16K 1/22* (2013.01); *G01D 5/142* (2013.01); *H04W 4/38* (2018.02)

(58) Field of Classification Search
CPC ........ F16K 37/0041; F16K 1/22; H04W 4/38; G01D 5/142
See application file for complete search history.

(56) References Cited

U.S. PATENT DOCUMENTS

| 4,936,289 | A | * | 6/1990 | Peterson | F24D 19/1054 122/13.3 |
| 8,233,876 | B2 | * | 7/2012 | Kakani | H04W 72/535 455/338 |
| 10,003,211 | B1 | * | 6/2018 | Leabman | H04B 5/0037 |
| 2008/0034882 | A1 | * | 2/2008 | Ohta | F16K 37/0083 73/777 |
| 2011/0180165 | A1 | * | 7/2011 | Hansson | F16K 1/36 137/554 |
| 2015/0149100 | A1 | * | 5/2015 | Eisenbeis | F16K 31/04 702/58 |
| 2015/0362090 | A1 | * | 12/2015 | Anderson | F16K 37/0041 137/551 |

FOREIGN PATENT DOCUMENTS

WO WO-9922169 A1 * 5/1999 ......... F16K 37/0083

* cited by examiner

*Primary Examiner* — Angelisa L. Hicks
(74) *Attorney, Agent, or Firm* — Ballard Spahr LLP

(57) ABSTRACT

A valve position monitor can determining a position of a valve stem of a valve. The valve position monitor can comprise a receptacle for coupling to a valve stem. A rotation sensor can be configured to output a first signal corresponding to a rotational position of the valve stem. A transmitter can be in communication with the rotation sensor. The transmitter can be configured to transmit a second signal corresponding to the rotational position of the valve stem to a remote receiver. A power source can be in communication with the transmitter.

19 Claims, 11 Drawing Sheets

400 ⟶

Home | Notifications | Subscribers | Log Out admin

| Valve ID | Asset ID | Size | Turns To Full Open | Latitude | Longitude | Status | Battery | Google Maps Link |
|---|---|---|---|---|---|---|---|---|
| 0 | VV01A05100 | 14.0 | 1.0 | 38.8907 | -76.9093 | Opened | Good | View |
| 1 | VV01A05105 | 8.0 | 1.0 | 38.8920 | -76.9068 | Closed | Good | View |
| 2 | VV01A06018 | 6.0 | 1.0 | 38.8981 | -76.8970 | Closed | Good | View |
| 3 | VV01A06021 | 6.0 | 1.0 | 38.8983 | -76.8962 | Closed | Good | View |
| 4 | VV01A06025 | 8.0 | 1.0 | 38.8985 | -76.8954 | Closed | Good | View |
| 5 | VV01A06030 | 6.0 | 1.0 | 38.8988 | -76.8944 | Closed | Good | View |
| 6 | VV01A06038 | 8.0 | 1.0 | 38.8992 | -76.8927 | Closed | Good | View |
| 7 | VV01A06049 | 8.0 | 1.0 | 38.8998 | -76.8901 | Closed | Good | View |
| 8 | VV01A06114 | 24.0 | 1.0 | 38.8976 | -76.8827 | Closed | Good | View |
| 9 | VV01A06115 | 14.0 | 1.0 | 38.8975 | -76.8827 | Closed | Good | View |
| 10 | VV01A06176 | 8.0 | 1.0 | 38.8909 | -76.9035 | Closed | Good | View |

FIG. 14

VALVE POSITION MONITOR, AND SYSTEMS AND METHODS OF USING SAME

CROSS-REFERENCE TO RELATED APPLICATION

This application claims priority to and the benefit of U.S. Provisional Patent Application No. 62/847,380, filed May 14, 2019, the entirety of which is hereby incorporated by reference herein.

FIELD

This application is directed to devices, systems, and methods for monitoring the position of valves.

BACKGROUND

Proper positioning of isolation (division) valves plays a critical role in the operation of water transmission systems. Isolation valves, when left in an incorrect position, can cause issues within the water transmission system, such as, for example, difficulty balancing flow and pressure as well as unwanted draining of water standpipes and towers. Currently, the status of underground public water main valves cannot be checked or monitored without a water system operator physically being on-site and turning the valves. Accordingly, it is difficult for a water utility to determine if an underground valve is operated without authorization or the wrong valve is inadvertently operated throughout the course of maintenance or construction activities.

There is a need for improved systems and methods for monitoring the status of underground isolation valves, such underground public water main valves.

SUMMARY

Disclosed herein, in some aspects, is valve position monitor for determining a position of a valve stem of a valve. The valve position monitor can comprise a housing. A shaft can be rotatably disposed within the housing, the shaft having a first end. A coupling at the first end of the shaft can be configured to couple to a valve stem. A rotation sensor within the housing can be configured to output a first signal corresponding to a rotational position of the shaft. A transmitter can be disposed within the housing and in communication with the rotation sensor. The transmitter can be configured to transmit a second signal corresponding to the rotational position of the valve stem to a remote receiver. A power source can be disposed within the housing and in communication with the transmitter.

A valve can comprise a valve body and a flow metering body that is movable within the valve body about and between a closed position and a fully open position. A stem can be coupled to the flow metering body, wherein rotation of the stem is configured to move the flow metering body between the closed position and the fully open position. A rotation sensor can be configured to output a signal corresponding to a rotational position of the valve stem. A transmitter can be in communication with the rotation sensor. The transmitter can be configured to transmit the rotational position of the valve stem to a remote receiver. A power source can be in communication with the transmitter.

A system can comprise a plurality of valves, each valve comprising a valve body and a flow metering body that is movable within the valve body about and between a closed position and a fully open position. A stem can be coupled to the flow metering body, wherein rotation of the stem is configured to move the flow metering body between the closed position and the fully open position. A rotation sensor can be configured to output a signal corresponding to a rotational position of the valve stem. A transmitter can be in communication with the rotation sensor, wherein the transmitter is configured to transmit a signal corresponding to the rotational position of the valve stem. A power source can be in communication with the transmitter. The system can further comprise a display device and a computing device in communication with the transmitter of each valve of the plurality of valves and the display device. The computing device can comprise at least one processor and a memory. The memory can comprise instructions that, when executed by the at least one processor, cause the at least one processor to: receive the signal corresponding to the rotational position of the valve stem from a valve of the plurality of valves, and display, on the display device, a value corresponding to a relative position of the valve.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

FIG. 14 is an exemplary display of the computing device, including features for displaying valve information and status, processing valve alert messages, and reporting to subscribed users.

DETAILED DESCRIPTION

Figure 1:
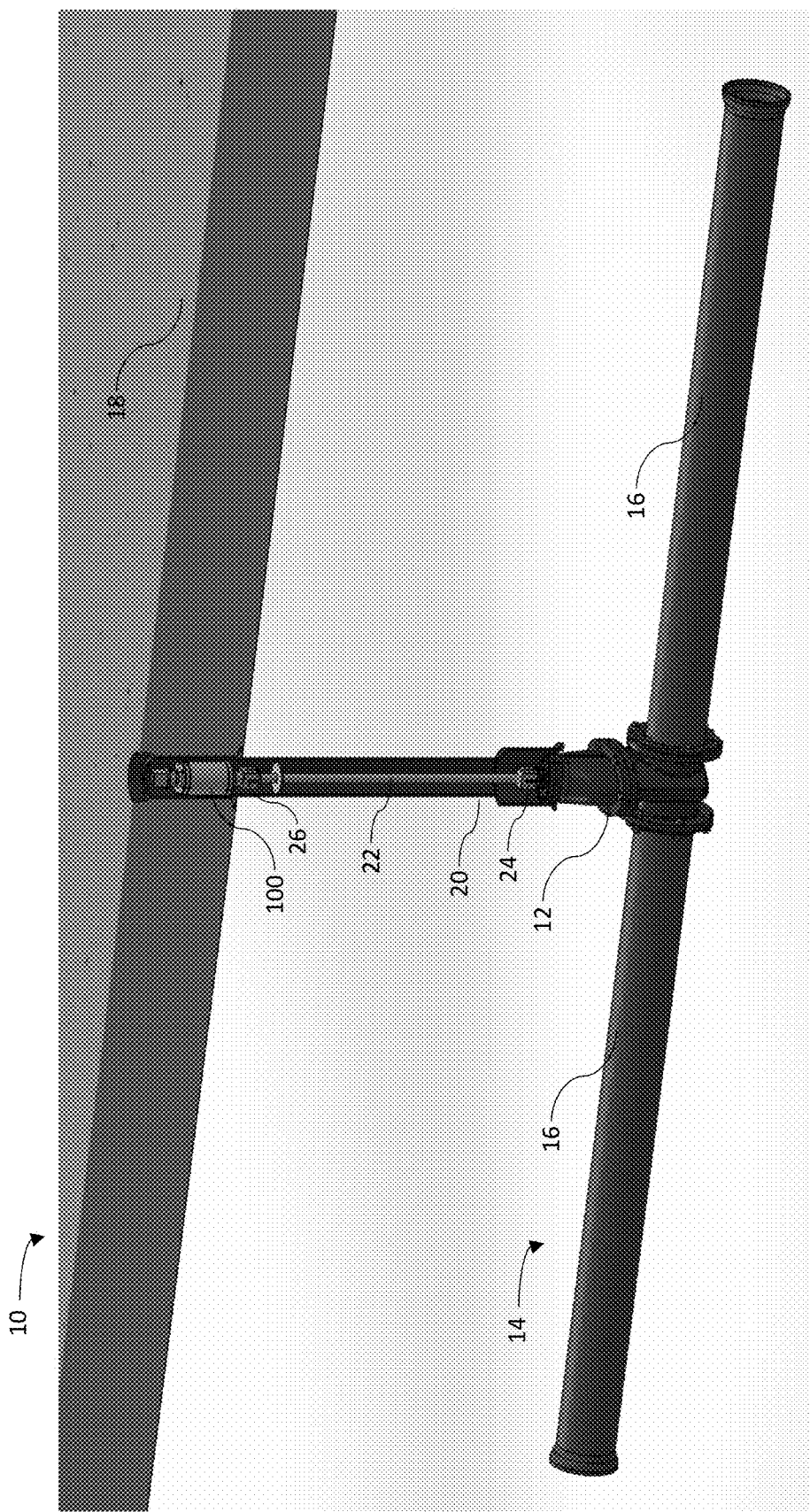
FIG. 1 is a perspective view of an exemplary system comprising a valve coupled to a valve position monitoring device in accordance with embodiments disclosed herein.

The present invention can be understood more readily by reference to the following detailed description and appendix, which include examples, drawings, and claims. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an," and "the" include plural referents unless the context clearly dictates otherwise. Thus, for example, reference to "a valve" can include two or more such valves unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Disclosed herein, in various aspects, are devices, systems, and methods for monitoring an operational status (e.g., position) of a valve (e.g., an underground valve). As further described below, it is contemplated that the disclosed devices, systems, and methods can permit monitoring of the operational status (e.g., position) of the valve at both the valve box and at a remote control center as further disclosed herein. To monitor and indicate the position of critical underground public water main valves, it is contemplated that a valve monitoring device can be provided within (optionally, retrofit to) a valve box, which can provide an enclosure for valve components. In use, the device can monitor the position of the valve and provide a visual indication of the operational status (e.g., position) of the valve after the valve box cover has been removed. An output indicative of the operational status (e.g., position) of the valve can also be sent to a user interface (optionally, a remote control and monitoring center) using a wireless network (e.g., cellular or Wi-Fi network or Bluetooth connection).

In use, the disclosed user interface can be configured to compile the operational status of all monitored valves in a selected area (e.g., geographic region). Through the use of the user interface, it is contemplated that the operational status of all valves having respective valve position monitoring devices coupled thereto (e.g. a plurality of valves within the selected area) can be monitored from a single, central location, thereby eliminating the need for physical on-site operator valve checks. Optionally, as further disclosed herein, a computing device can be in communication with the valve position monitoring devices and also provide or be associated with the user interface. It is further contemplated that the ability to immediately and remotely monitor valve status can result in significant savings in both time and money.

Optionally, the user interface can be provided as a component of a remote computing device such as a computer, a tablet, a smart phone, or other smart device. In some aspects, the remote computing device can be configured to execute software or an application that generates the user interface and is configured to receive wireless signals/inputs corresponding to the operational status of various valves. In other exemplary aspects, it is contemplated that the user interface can be configured to display at least a one-color output corresponding to the operational status of a given valve within the selected area. In these aspects, it is contemplated that a single display can provide a visual, color-based indication of the operational status (e.g., position) of all the valves within the selected area (e.g., red indicating closed, and green indicating open), thereby allowing for prompt identification of any problem valves (i.e., valves that are not functioning correctly or as desired).

Referring to FIG. 1, a water delivery system 10 can comprise a valve 12 operably disposed within a pipeline 14 comprising a plurality of pipes 16 that can, in some embodiments, be buried (e.g., beneath or next to a roadway 18). A valve box 20 can extend from the valve 12 to or near the surface of the roadway 18. The valve 12 can couple to a valve position monitoring device 100, optionally, via valve stem extension 22, as further disclosed herein. In some aspects, the valve position monitoring device 100 and valve stem extension 22 can be disposed within the valve box 20.

Figure 2:
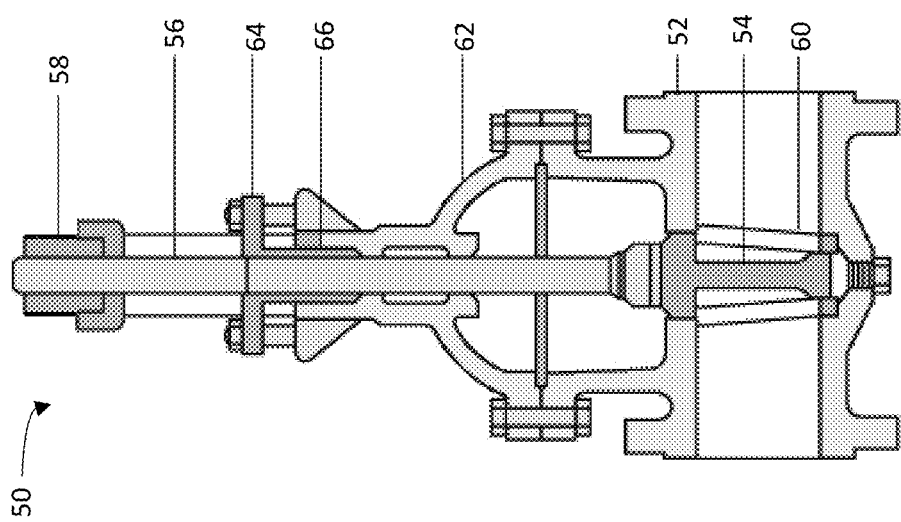
FIG. 2 is a cross sectional view of a gate valve.

Referring to FIG. 2, in some aspects, the valve 12 (FIG. 1) can be a gate (or sluice) valve 50. The gate valve 50 can comprise a valve body 52 and a wedge 54 (i.e., a gate) that is movable about and between a closed position (e.g., a down position) and a fully open position (e.g., an up position). The wedge 54 can be coupled to a valve nut 58 via a valve stem 56. The wedge 54 can be coupled to the valve body 52 via threads, and rotation of the valve nut 58 can cause the wedge 54 to move about and between the closed position and the fully open position. When in the closed position, the wedge 54 can engage a seat 60 to shut off the flow through the valve body. The valve stem 56 can extend upwardly through a bonnet 62. Rotation of the valve stem can cause the wedge 54 to ride up and down the valve stem and into and out of the cavity of the bonnet 62, thereby opening and closing the valve. The gate valve 50 can further comprise a gland follower 64, which can define respective openings for receiving the valve stem and can provide a water-tight seal between the bonnet 62 and the valve stem 56. Optionally, a portion of the gland follower can be received within, and in alignment with, the cavity of the bonnet. The bonnet 62, which can be a screw-in, unitary, or bolted bonnet, can be configured to form a pressure-tight seal with the valve stem 56. The gland follower 64 can comprise gland packing 66 to seal the valve stem against the bonnet 62.

Figure 3:
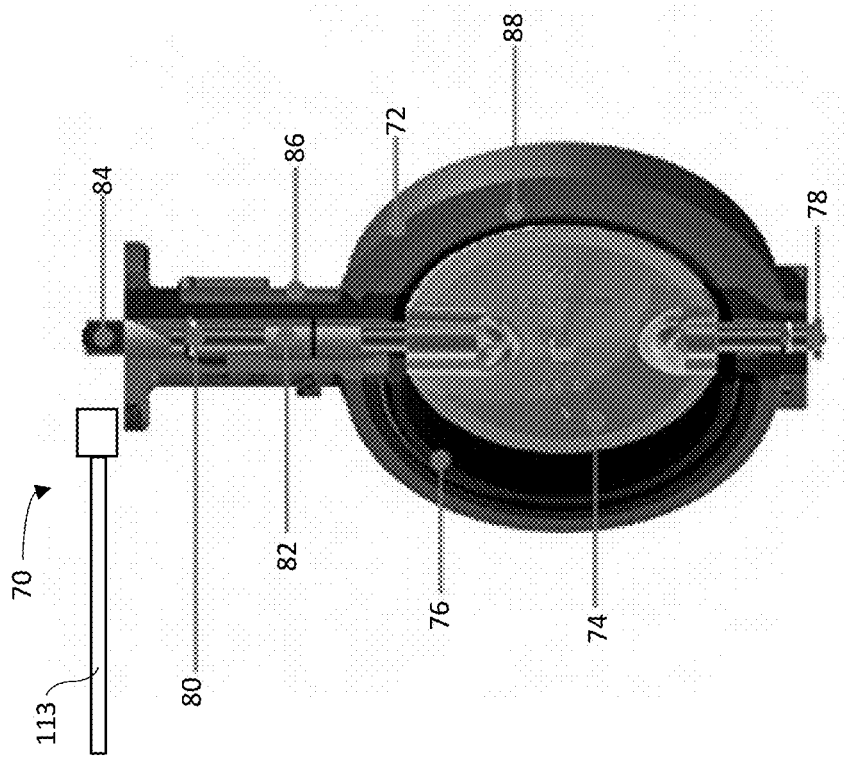
FIG. 3 is a sectional side view of a butterfly valve.

Referring to FIG. 3, in some aspects, the valve 12 (FIG. 1) can be a butterfly valve 70. The butterfly valve 70 can comprise a valve body 72 that defines a flow path. A disc 74 can be received within the valve body. In exemplary aspects, the disc 74 can be pivotable between a closed position, wherein the faces of the disc 74 are perpendicular to the flow path, and a fully open position, wherein the faces of the disc 74 are parallel to, or generally parallel (e.g., within 5 degrees or within 10 degrees of being parallel), to the flow path. The valve 70 can comprise a seat 76 that the disc 74 engages in the closed position. The seat of the valve body can optionally comprise a rigid ring 88. The disc 74 can pivot about a lower shaft 78 and an upper shaft 80. The upper shaft 80 can extend through a bushing 82 within a neck 86 of the valve body. The upper shaft 80 can define a nut 84 at its upper end. Optionally, the nut 84 can have a square cross section.

In further aspects, although not discussed in detail herein, the valve 12 (FIG. 1) can be provided in other configurations. For example, it is contemplated that the valve 12 can be a globe valve, a ball valve, or any other suitable valve known to those skilled in the art.

Figure 4:
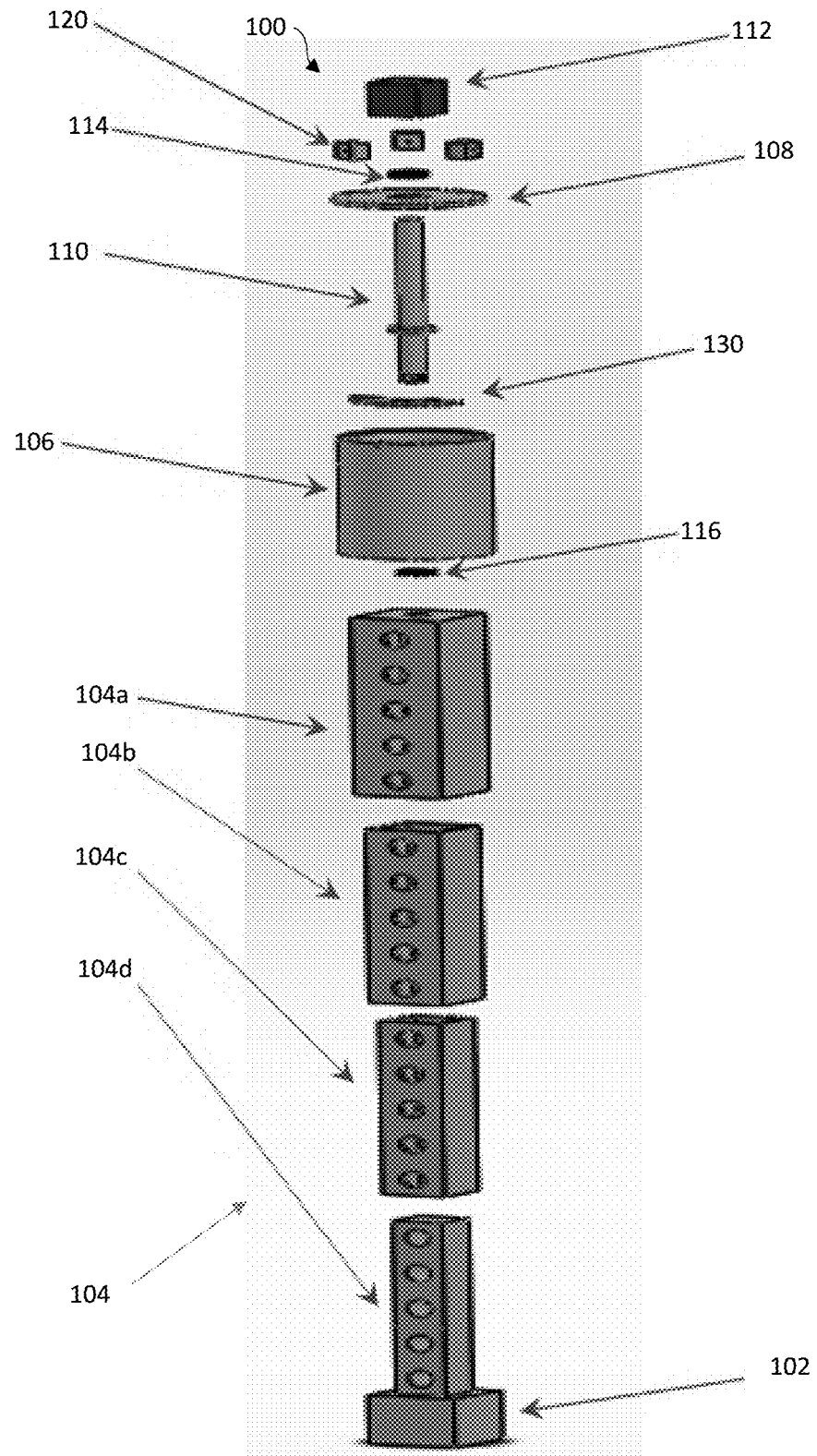
FIG. 4 is an exploded view of an exemplary housing of a valve position monitoring device as disclosed herein.
Figure 5:
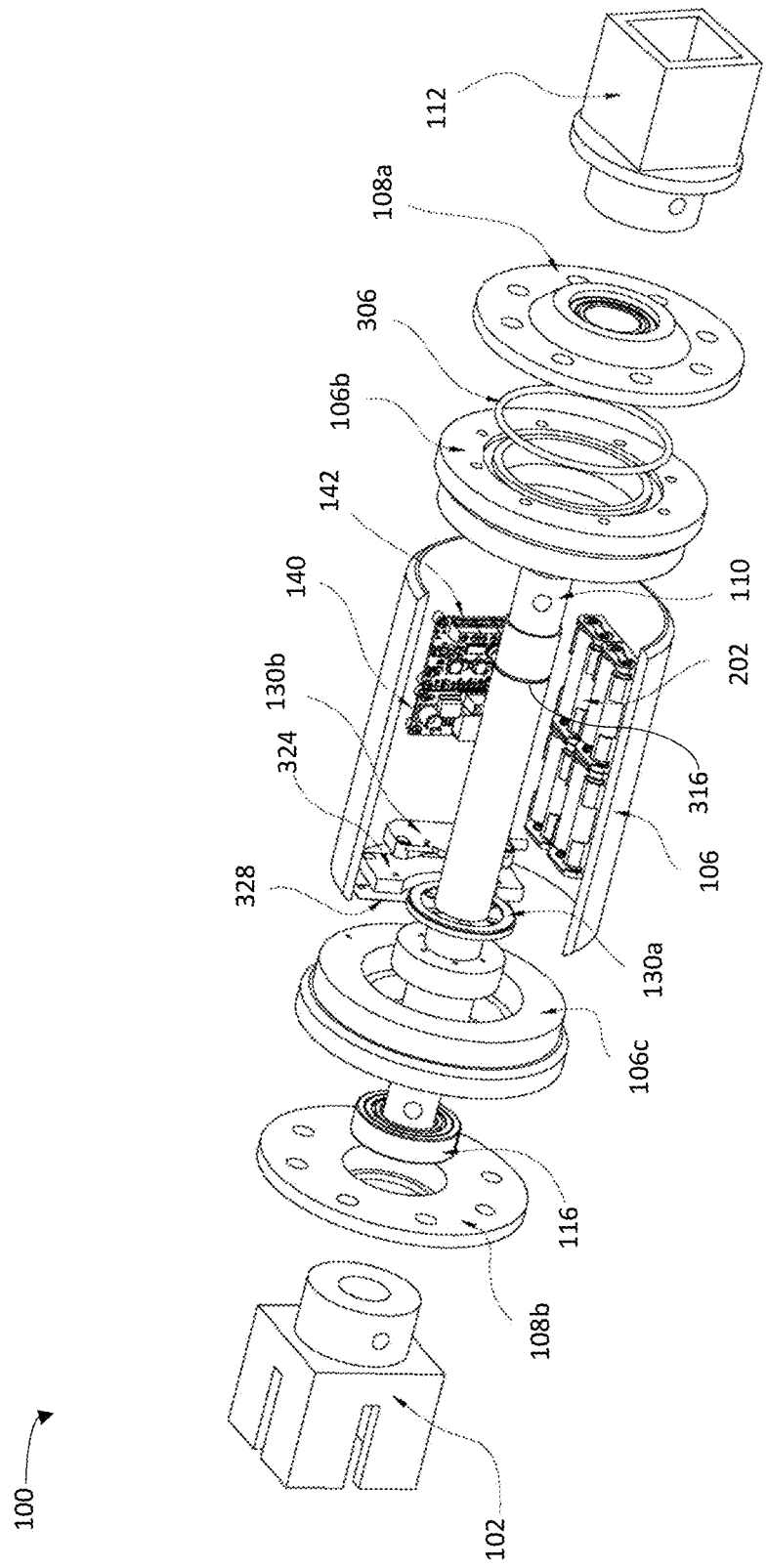
FIG. 5 is an exploded view of an exemplary valve position monitoring device in accordance with embodiments disclosed herein.
Figure 6:
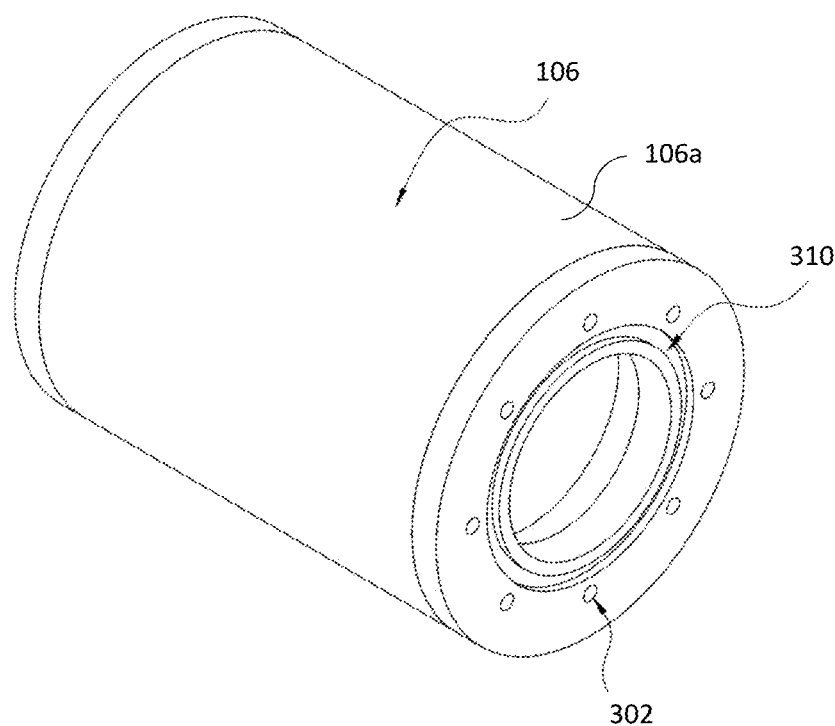
FIG. 6 is a perspective view of the housing body of the valve position monitoring device of FIG. 5.
Figure 7:
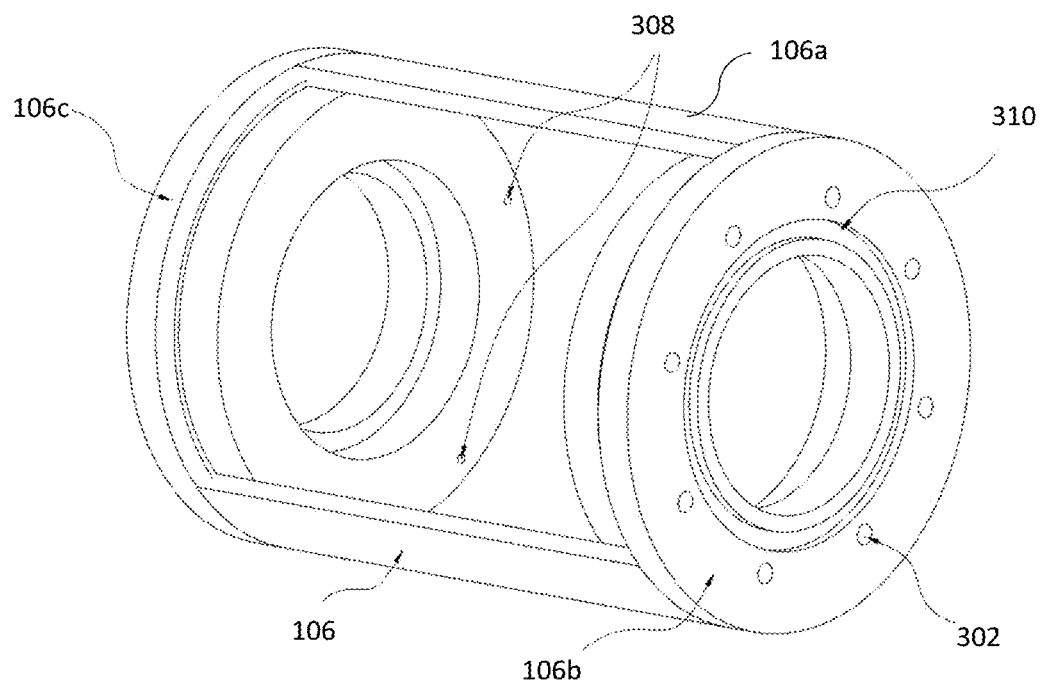
FIG. 7 is a cutaway view of the housing body of FIG. 6, showing the features for attachment of the sensor mount.
Figure 8:
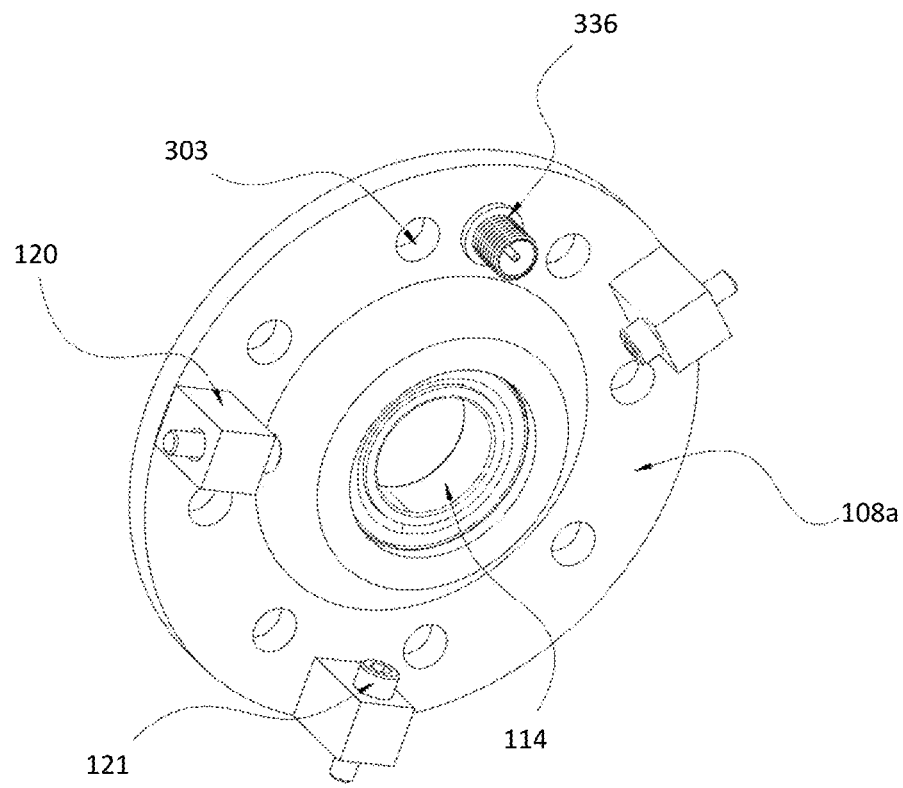
FIG. 8 is a front perspective view of an exemplary top housing lid having features for housing a shaft bearing, stabilization tabs and clamping bolts.
Figure 9:
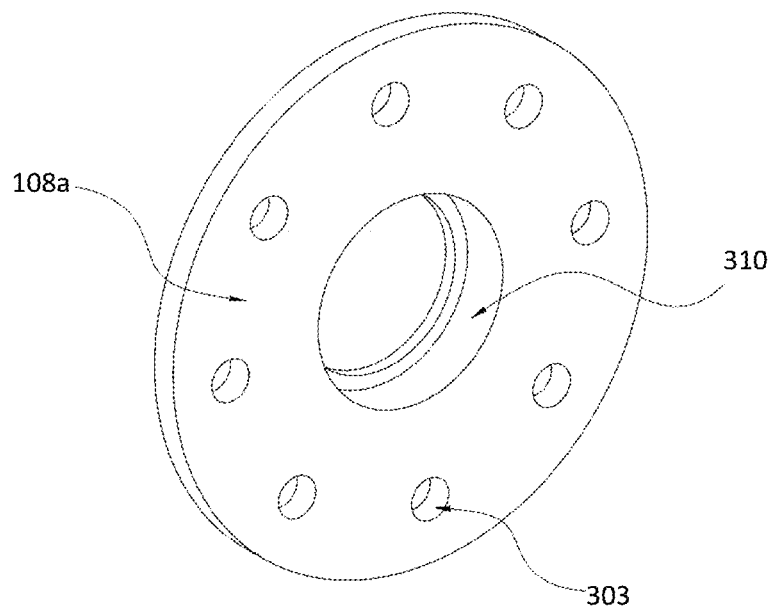
FIG. 9 is a back perspective view of the housing lid of FIG. 8, showing the features of bolt holes and bearing cavity.
Figure 10:
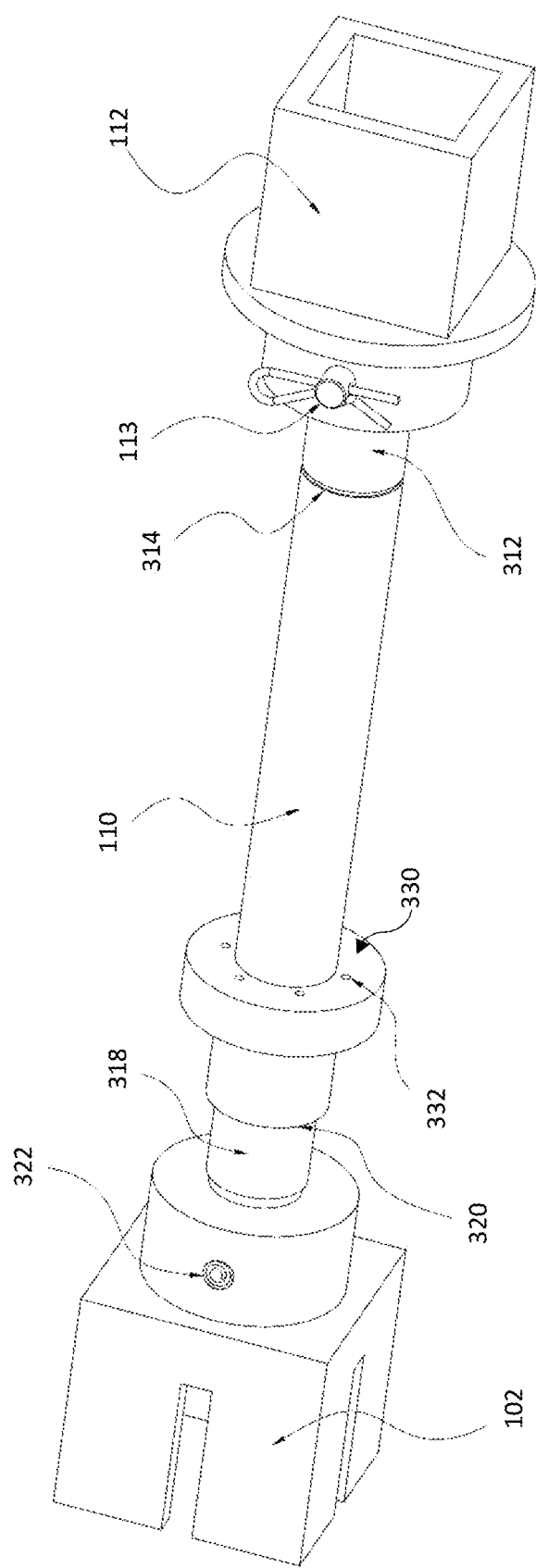
FIG. 10 is a perspective view of an exemplary shaft having the features for attachment of the rotary sensor ring, upper and lower bearing and retaining snap ring. As shown, the shaft has an operating nut and female nut coupling attached with a clevis pin and a spring pin, respectively.
Figure 11:
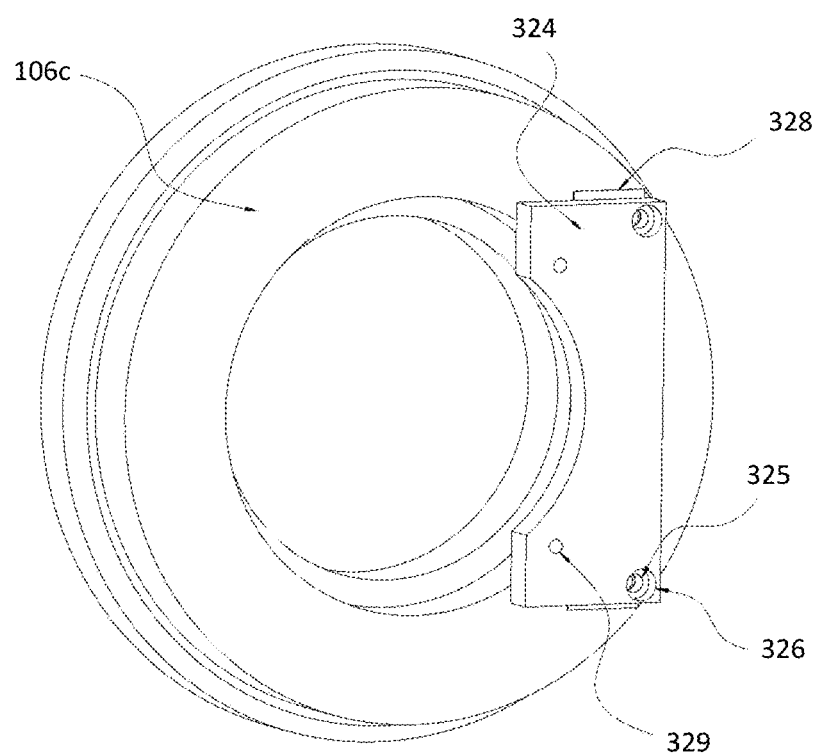
FIG. 11 is a perspective view of an exemplary sensor mount having the features for shimming the sensor mount to adjust clearances and attachment of the stationary sensor head.

Referring to FIGS. 1 and 4, the valve position monitoring device 100 can be configured to couple to the valve. In some aspects, the valve position monitoring device 100 can comprise a coupling defined by a receptacle 102 that can couple to the nut of the valve. In these aspects, it is contemplated that the receptacle can have a cross section that is complementary to the shape of the nut of the valve. For example, as valves conventionally have nuts with square cross sections, the receptacle of the valve position monitoring device can have a receptacle 102 with a corresponding square cross section to receive the nut. Optionally, a set screw or other fastening device can releasably couple the valve position monitoring device 100 to the valve nut. In further optional aspects, the valve position monitoring device can remain coupled to the valve nut by virtue of the weight of the valve position monitoring device and the valve stem extension and, as further disclosed herein, a coupling between the valve position monitoring device and the valve box.

In further aspects, the coupling between the valve position monitoring device 100 and the valve 12 can comprise the valve stem extension 22. The valve stem extension 22 can extend between and couple to the valve 12 and the valve position monitoring device 100. The valve stem extension 22 can comprise a nut receptacle 24 at a first end for receiving the nut of the valve and a corresponding coupling 26 at a second end, opposite the first end, for coupling to the valve position monitoring device. For example, the receptacle at the first end of the valve stem extension 22 can have corresponding cross sections (e.g., square cross sections) that match the nut of the valve. The second (e.g., upper) end of the valve stem extension can be configured to couple to the valve position monitoring device. For example, it is contemplated that the second (upper) end of the valve stem extension 22 can comprise a nut having the same square cross section as the nut of the valve so that the valve position monitoring system can be received into the receptacle 102 of the valve positioning device. It is contemplated that the valve stem extension 22 can be provided in various lengths to accommodate valves buried at different depths.

In still further aspects, the valve position monitoring device 100 can comprise a telescoping extension 104, comprising a plurality of nesting members (e.g., extension members 104a, 104b, 104c, and 104d, optionally having rectangular cross sections), and the receptacle 102 can be positioned at the end of the telescoping extension 104. The nesting extension members can define longitudinally spaced through-holes, and relative longitudinal positions of adjacent members can be fixed via respective bolts or pins (e.g., clevis pins) through aligned through holes in the respective adjacent members. In this way, the valve position monitoring device 100 can be configured for use with valves having various depths.

As shown in FIGS. 4-10, the valve position monitoring device 100 can comprise a housing body 106. The housing body 106 can comprise a cylindrical sleeve 106a and top and bottom portions 106b,c on opposing longitudinal ends of the sleeve 106a. The bottom portion 106b can define mounting holes 308 for mounting internal components (e.g., a sensor mount, further disclosed herein). A top housing lid 108a can be attached via screws to the top portion 106b of the housing body 106, for example, via fasteners (not shown) that extend through clearance holes 303 in the top lid housing and are received within threaded holes 302 in the top portion of the housing body. A bottom housing lid 108b can be coupled to a bottom of the bottom portion 106b of the housing body, for example, via fasteners received within threaded holes in the bottom portion of the housing body. Each of the top and bottom portions 106b,c of the housing body 106 can define respective channels 304 for accepting respective O-rings 306. The O-rings 306 can provide a water-tight seal when the top housing lid 108a and bottom housing lid 108b are coupled to the housing 106. The housing body 106 of the valve position monitoring device 100 can be water-tight and corrosion resistant. The top housing lid 108a can be configured to be removed to provide access to the interior components (e.g., to change the battery), optionally, through the hole in the top portion 106b of the housing 106. Accordingly, in some optional aspects, the hole in the top portion 106b of the housing 106 can be large enough for the battery, the sensor, the microcontroller, and the other internal components to pass through. The housing body 106 can optionally be configured to be received within the valve box 20.

A shaft 110 can couple to the receptacle 102 and can extend through the housing body 106 and above the top housing lid 108a to couple to a nut 112. For example, in some aspects, the top end of the shaft can extend from the top end of the housing, and the operating nut 112 can slide over the shaft 110 and be pinned to the shaft via a clevis pin 113. It is further contemplated that the shaft 110 and nut 112 can optionally be welded to the shaft or integrally formed as a monolithic, unitary structure. The shaft 110 can be rotatably supported by the housing via an upper bearing 114 and a lower bearing 116. The shaft can define an upper mating surface 312 for engaging the upper bearing 114. The upper mating surface 312 can have a select diameter to provide a tight fit (e.g., a press fit) to the inner race of the upper bearing 114. The shaft 110 can further define a snap ring groove 314 for receiving a snap ring 316. The inner race of the upper bearing 114 can be configured to seat against the snap ring 316. The shaft can further define a lower mating surface 318 that is sized to be received within the lower bearing 116 as a tight fit. A shoulder 320 above the lower mating surface 218 can seat against the inner race of the lower bearing 116. In some aspects, the receptacle 102 can comprise a cylindrical bore that receives a lower end of the shaft 110, and a spring pin 322 can couple the receptacle 102 to the shaft.

In some aspects, the top housing lid 108a can define a bearing cavity 310 that can receive the upper bearing 114 therein (optionally, press-fit therein). Optionally, the upper bearing 114 can be a fully-sealed bearing that can function as a shaft seal to prevent water from permeating the housing between the shaft and the housing lid 108. In further aspects, a separate seal can be positioned between the shaft and housing to inhibit water intrusion. Optionally, the upper bearing 114 can be a thrust bearing or a rotary bearing (e.g., a ball bearing). The lower bearing 116 can optionally be a thrust bearing. Optionally, the lower bearing 116 can be a sealed bearing. The lower (thrust) bearing 116 can optionally be press fit onto the shaft. In some aspects, the lower bearing 116 can rest on the top extension shaft portion 104. In further aspects, the outer race of the lower bearing 116 can bias against the housing body 106 or bottom housing lid 108b. An operator can adjust the position of the valve by rotating of the nut 112 using a wrench 113, thereby rotating the shaft 110, which can, in turn, rotate the receptacle 102 and, thus, the valve nut (optionally via the shaft extension 22). Thus, it is contemplated that the valve position monitoring device 100 can be retrofit to an existing valve without affecting the function or operation of the valve.

The valve position monitoring device 100 can comprise a plurality of stabilizers 120 that can project from the housing lid and support the position of the housing within the valve box. Optionally, the stabilizers 120 can be welded to (or integrally formed with) the housing lid at circumferentially spaced positions (e.g., 120 degrees apart) around the circumference of the lid. The stabilizers 120 can define radially extending threaded holes. Screws 121 can extend through the threaded holes so that tightening the screws causes the ends of the screws to extend radially outwardly (relative to a central axis of the device 100) to bias against and frictionally engage the valve box. In this way, the housing of the valve position monitoring device can be held in a fixed position as the shaft 110 rotates.

The valve position monitoring device 100 can comprise a rotation sensor 130, such as, for example and without limitation, a rotary encoder, an electrical switch, inductive proximity sensor, Hall Effect sensor, magnetic sensor, reluctance sensor, optical sensor, infrared sensor, photoelectric laser sensor a plurality of circumferentially spaced switches, other rotation sensor, or combinations thereof, that is configured to determine, and output a signal corresponding to, a rotational position of the shaft and, optionally, a number of rotations of the shaft 110 (e.g., five degrees of rotation, ¼ turn, one turn, 5.2 turns, etc.). In some aspects, the rotation sensor 130 can comprise a first portion 130a that is fixedly coupled to the shaft so that rotation of the shaft causes corresponding rotation of the first portion 130a. A second portion 130b of the rotation sensor can be fixedly coupled to the housing. In this way, the second portion 130b can measure rotational movement of the first portion of the sensor 130a, which corresponds to rotation of the shaft. Thus, in exemplary aspects, the rotation sensor 130 can comprise a combination of sensors, with the first portion 130a corresponding to at least a first sensor and the second portion 130b corresponding to at least a second sensor. It is contemplated that, for use with a butterfly valve, the position sensor can be selected with a sensitivity sufficient to sense rotation within ten degrees, within five degrees, or within one degree; for use with a gate valve, the position sensor can be selected with a sensitivity sufficient to sense rotation within at least one quarter turn increments or one eighth of a turn.

The shaft can define a radially extending flange 330 that defines mounting holes 332 for coupling the first (rotating) portion 130a of the rotation sensor 130 to the shaft 110. In some aspects, the second (non-rotating) portion 130b of the sensor can be coupled to the housing via a sensor mount 324. The sensor mount 324 can comprise holes 325 that align with the mounting holes 308 in the bottom portion 106b of the housing for mounting the sensor mount thereto. The holes 325 can have counter bores 326 for receiving the heads of coupling screws so that the coupling screws can be flush with the top surface of the sensor mount. Optionally, one or more shims 328 can be positioned between the bottom portion of the housing and the sensor mount for alignment of the sensor mount. Holes 329 can receive screws for coupling the second portion 130b of the position sensor 130 to the sensor mount.

Figure 12:
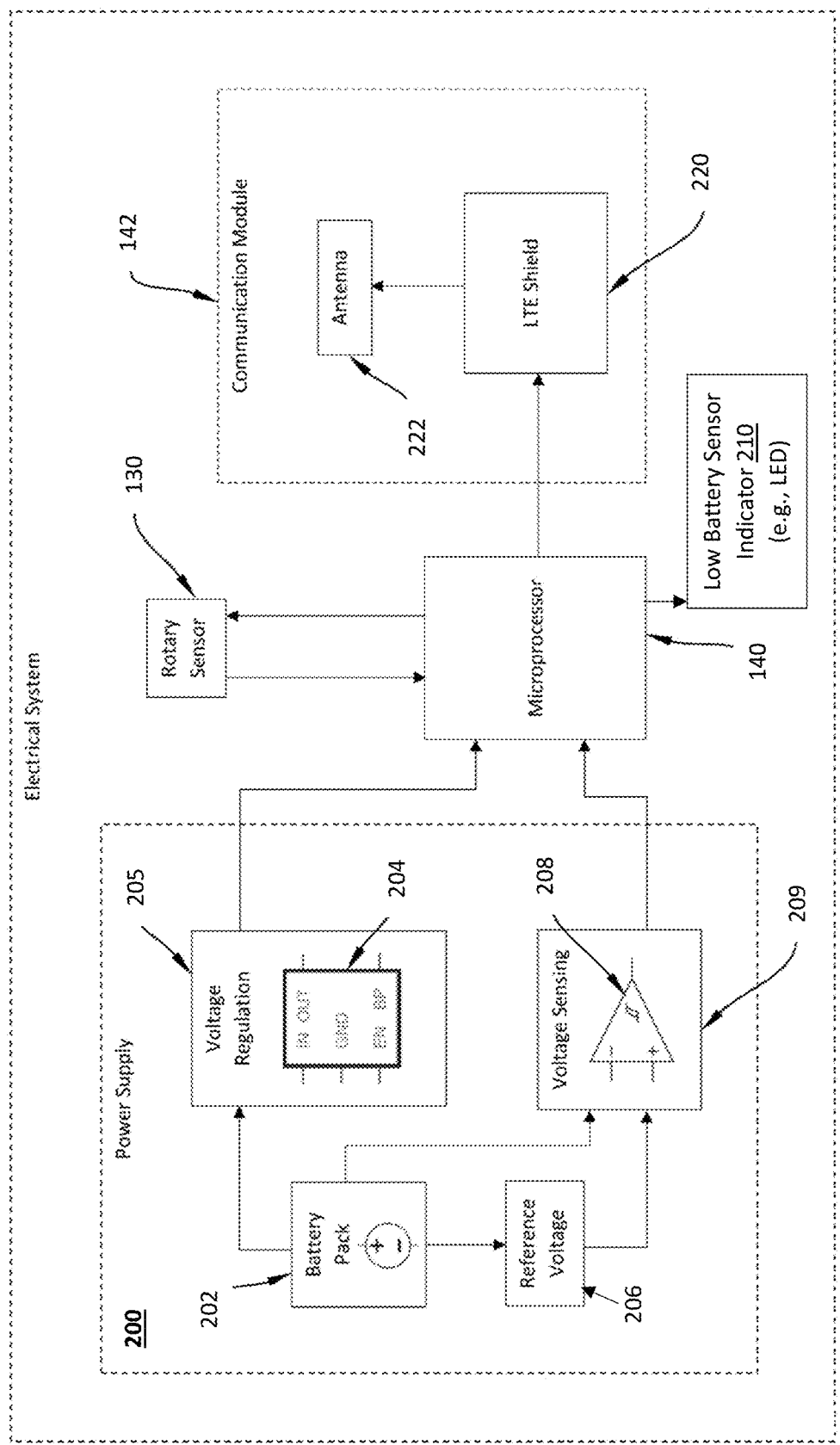
FIG. 12 is a block diagram of an exemplary electrical system having the features for power supply, voltage regulation, voltage sensing wireless communication and rotary sensor input.

As shown in FIG. 12, a microcontroller 140 or other computing device can be communicatively coupled to the position sensor 130 and configured to process the data collected by the rotation sensor 130. More particularly, the microcontroller can be configured to convert rotational data (received from the position sensor) into a corresponding number of turns to thereby track the number of turns (of the shaft or other portion of the valve). For example, in some aspects, the rotational position sensor 130 can output a signal corresponding to an angle, and the microcontroller can be configured to interpret the changes in the output from the rotational position sensor 130 to track the position of the shaft relative to a reference (baseline) position (e.g., five degrees of rotation, ¼ turn, one turn, 5.2 turns, etc.).

In some exemplary aspects, for a gate valve, the valve position monitoring device can store the number of total turns required to move the valve from the open position to the closed position. Each valve position monitoring device can be calibrated for its particular coupled valve. For example, the microcontroller can store an end point position (e.g., when the valve is in the closed position, or when the valve is in the open position) and the number of turns between the open position and the closed position. It is contemplated that the valve position monitoring device, after use with a first valve, can be coupled to a second valve and can be re-calibrated for use with the second valve. In some optional aspects, as the valve stem is moved via rotation of the shaft 110, the position sensor 130 can measure the movement, and the microcontroller 140 can be configured to add or subtract corresponding turn increments (e.g., ¼ turn or 10 degrees of rotation) relative to the end point (e.g., fully closed) position. The valve position monitor can output the relative position to the remote computing device. As further stated herein, it is contemplated that, in alternative embodiments, the calibration data can be stored on the remote computing device, and the valve position can, instead, be calculated at the remote computing device.

In some aspects, the microcontroller can comprise a transmitter 142 (communication module), which as further disclosed herein, can optionally be provided as a wireless transceiver. In some optional exemplary aspects, the transmitter 142 can comprise an LTE shield 220 (with removable SIM card) and remote wireless antenna 222. The LTE shield (78) provides a GSM signal which is used for communicating the device data by SMS message. The remote wireless antenna 222 can connect to a port 336 on the top housing lid 108a and can be positioned at the top of the valve box (60)

for cellular signal reception. Optionally, the transmitter can communicate data to a select web address.

Figure 13:
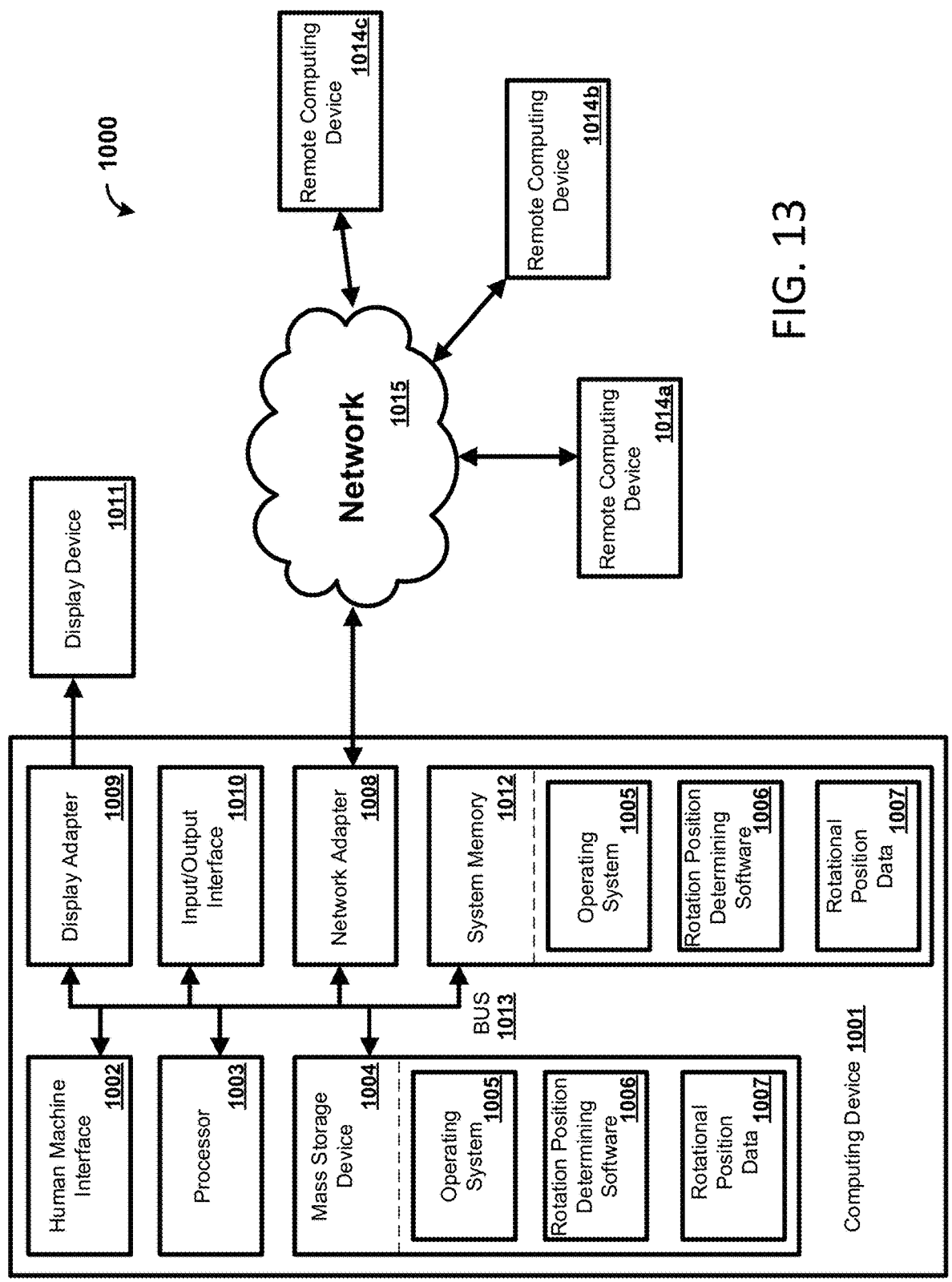
FIG. 13 is a block diagram of an exemplary computing system for providing data from the valve position monitoring device to a user.

The microcontroller can be communicatively (e.g., wirelessly) coupled to a remote computing device (e.g., computing device 1001, as shown in FIG. 13) that is running an application, and the microcontroller can transmit data to the remote computing device for use by the application. Optionally, the transmitter 142 can be a transceiver that can be configured for two-way communication. In this way, the microcontroller can receive information including, but not limited to, calibration information or requests to transmit data. For example, the remote computing device can send a signal to the valve position monitoring device 100 requesting a current position, and the valve position monitoring device can transmit the current position in response to receiving said request signal. In further aspects, the transmitter can be configured only for wireless transmission and is not configured to receive wireless transmission. It is contemplated that the battery life can be extended by enabling the transmitter to remain in a low power mode (or off) when not transmitting data, thereby avoiding power consumption required to receive data. Optionally, the transmitter can be configured to transmit the rotational data at spaced intervals (e.g., minutely, hourly, or daily, or at a user-specified interval). In further aspects, the transmitter can be configured to transmit the rotational data based on a change in the rotational position of the valve stem. For example, if an operator moves the valve position, the valve position monitoring device 100 can send a signal to the computing device 1001 that is indicative of the change in the valve position.

Referring to FIG. 12, a power supply 202 can be configured to provide power to the microcontroller 140 and position sensor 130. The power supply 202 can optionally comprise four AA batteries in series to provide a 6V power supply, a rechargeable lithium-ion battery, a nickel cadmium battery, or any suitable battery or other power source. The device can further include a power system 200 for providing power to the microcontroller 140 and position sensor 130. Optionally, the power system can comprise the power supply 202 (e.g., battery pack), a linear voltage regulator 204, a voltage regulation circuit 205, a reference voltage 206, a battery voltage sensor 208, and a voltage sensing circuit 209. In exemplary aspects, the regulator 204 can be configured to keep the battery voltage constant or substantially constant (e.g., within 5 or 10% above or below a stated level). For example, the voltage can be 5V (or within a range of 4.5 to 5.5 V or 4.75 to 5.25 V).

A voltage regulator circuit 205 can use a linear regulator 204 that can comprise an internal transistorized system for stepping down voltage. The linear regulator 204 can be a low power device with a high current rating to handle the demands of all the electrical components in the device. The battery voltage sensing circuit 209 can integrate a low voltage comparator integrated circuit (IC) 208 that compares the actual battery voltage to a reference voltage and provides a signal to the microprocessor 140 when the voltage drops below a set threshold. The power system 200 can be configured to alert the user when the power source 202 (e.g., battery pack) is close to depletion, e.g., via a low battery sensor indicator 210 (e.g., LED or other indicator) when the voltage drops below a threshold. It is further contemplated that the battery voltage sensor 208 can be configured to provide a battery charge level signal or low battery signal to the microcontroller 140. Optionally, it is contemplated that some or all of the power system 200 can be integral to the microcontroller 140.

As disclosed herein, it is contemplated that the transmitter 142 can be configured to transmit to the remote computing device a signal corresponding to an amount of charge on the battery, such as a charge percent. In further aspects, the transmitter can be configured to transmit to the remote computing device a low battery signal indicating that the amount of charge on the battery has dropped below a threshold. Optionally, the transmitter can be triggered to transmit said low battery signal upon the amount of charge on the battery dropping below the threshold.

In some optional aspects, a flow meter (e.g., a magnetic flow meter) can be in communication with the microcontroller 140. The flow meter can be installed in-line with the piping system. The flow meter can provide data via wired connection or wirelessly to the valve position monitoring device 100. In this way, the valve position monitoring device can relay the flow data to a remote computing device. The flow meter can be configured to determine a flow rate through the valve. The microcontroller 140 can be configured to transmit the flow rate to the remote computing device 1001.

Optionally, in some embodiments, it is contemplated that the housing of the mechanical structure need not be mounted to a valve stem as disclosed herein. More particularly, in these embodiments, it is contemplated that the position sensor can be built into the body of the valve with a suitable connection(s) for the power and communication systems disclosed herein. It is further contemplated that the power supply, a cellular or other antenna, and the microcontroller/microchip can be provided within a waterproof enclosure that is in communication with the position sensor and, optionally, incorporated within the valve itself. Thus, it is contemplated that the valve position monitoring device 100 can be incorporated within the valve. Accordingly, the rotation sensor 130 can be configured to detect the position of the valve stem itself (rather than another shaft that is coupled to the valve stem).

Operation of the Valve Position Monitor

Referring to FIG. 12, in some aspects, the rotation sensor 130 can output a first signal (e.g., a voltage) corresponding to the rotational position of the shaft 110, and the transmitter 142 can be configured to transmit a second signal corresponding to the rotational position of the shaft 110. For example, in some aspects, the microcontroller 140 can be configured to receive the first signal from the rotation sensor 130, process the first signal, and output, via the transmitter 142, a second signal corresponding to the rotational position of the shaft to a remote receiver (e.g., the computing device 1001). The second signal can be, for example, one of radio frequency, cellular communication protocols such as short message service (SMS) or multimedia messages service (MMS), Wi-Fi, or Bluetooth.

In some aspects, the microcontroller can be configured to count a number of revolutions of the shaft 110. For example, it is contemplated that the rotational sensor 130 can output a value corresponding to an angular position. Thus, in some aspects, before and after one complete revolution, the rotational sensor 130 can output the same output signal, whereas the valve (e.g., a gate valve) can be in different positions before and after one complete revolution. Thus, the microcontroller 140 can be configured to process the changes in the rotational position (an angular displacement) of the shaft 110 to count the number of rotations from a first (reference) position to a current angular position. For an exemplary position sensor outputting a proportional signal between zero and five volts over one rotation, the microcontroller can interpret the following sequence as one complete revolution when staring from a first position at which the position sensor is outputting 2.5 volts: a change of an upwardly increasing output to five volts, a drop to zero volts after crossing the five volt maximum threshold, and an increase back up to 2.5 volts.

Optionally, the second signal that the transmitter transmits can correspond to an angular displacement (or a number of rotations of the valve) from a reference position. In some aspects, the reference position can correspond to a first reference numerical value that is stored in the remote computing device 1001 (FIG. 13). For example, the valve position monitoring device 100 can be calibrated so that a first reference position of the shaft, corresponding to the valve being shut off, can be stored (e.g., in the remote computing device 1001). In further optional aspects, a second reference position (e.g., 5.2 rotations from the first reference position) corresponding to a fully open position can be stored. Thus, in some aspects, the computing device 1001 can calculate a relative opening amount (e.g., an open percentage) based on the first reference position, the second reference position, and the current rotational position of the shaft 110. That is, the difference between the current rotational position and the first reference position can be related to the difference between the first reference position and the second reference position. Optionally, the correlation between the current rotational position and the difference between the first and second reference positions can be expressed as a percentage by which the valve has been opened (due to rotation). For example, if 5.2 rotations from the reference position corresponds to the fully open position, then 2.6 rotations from the first reference position can correspond to a 50% open valve.

In further aspects, the valve position monitoring device 100 can be calibrated so that the microcontroller 140 can store calibration settings comprising the first reference position (e.g., the rotational position of the shaft when the valve is closed) and the second reference position (corresponding to a fully open position). It is, therefore, contemplated that the valve position monitoring device can comprise at least one of a wireless receiver or a wired communication port for receiving calibration (and other) data. Thus, in some aspects, the microcontroller 140 can calculate a relative valve opening amount (e.g., an open percentage) based on the first baseline value, the second reference position, and the current rotational position of the shaft 110. Accordingly, in some optional aspects, the microcontroller 140, via the transmitter 142, can transmit the relative valve opening amount to the receiver (e.g., the remote computing device 1001). In further aspects, the microcontroller can determine and transmit signals that are indicative of whether the valve is open or closed (or, in some embodiments, partially open).

The computing device 1001 can be configured to aggregate and display valve status information for valves having valve position monitoring devices. The computing device can display, for example, valve status (open/closed), open percentage, estimated flow therethrough, and/or battery status. In some optional aspects, the valve position data can be grouped and sorted by location, whether valves are in fluid communication, etc. In some optional aspects, the data from the valve position monitoring devices can be integrated with other data, such as pressure and flow data, for optimizing positions of each valve within a fluid network.

In some aspects, a web application can cooperate with the device to provide the user interface for monitoring the respective sensed valves positions and battery charge for each device. In some aspects, rotational data and battery voltage are communicated from the device to the web application using a wireless LTE shield 220 and SMS messaging. An SMS message can be sent to the server whenever the valve rotation changes, at select intervals, or when the device is low on power. The web application can act as the communication hub between the valve position monitoring device and the utility end users. The web application can receive incoming data from the device, process the data, and report alerts to the subscribed users through SMS messages and emails.

In some optional aspects, the web application can be built using the Flask web framework for the backend and Angular 1 with Bootstrap for the frontend. Optionally, in the backend, the application can use the Twilio API and a flask-email Python package to send SMS messages and emails to subscribers, respectively. Optionally, for data storage, the system can store the data locally (e.g., in the form of CSV files), and the system can be hosted using cloud services. In some optional aspects, the web application can have three main features: displaying a valves rotation status, processing valve alert messages, and reporting to subscribed users. For displaying valve rotation status, the valve information can be stored in the local database and can be displayed whenever the user accesses a main page 400 of the application. The information is shown in a table that includes all valves with their respective valve ID 402, valve size 404, close-to-open turn count 406, GPS coordinates 408, rotation status 410, battery status 412 and a link 414 to a map (e.g., GOOGLE Maps) providing the location of the valve. This can assist the utilities maintenance crews trace and locate the valve whenever there is an issue. When the application receives incoming alert messages from the valve position monitoring device, the application can process the messages before notifying the users. The application can check if the message format is correct and the phone number is correctly associated with the valve reported in the message. If all data is valid and verified, the web application can then update the valve status in its database and proceed to notify the subscribed users through email or SMS message of the change in valve status. An email or phone number can be added to the subscription database so that it can receive updates from the application. In some aspects, for security purposes, only the administrators have the authority to add or remove email or phone number from the subscription list.

In some aspects, the rotation status can be provided as "open," "closed," or "partially open." Thresholds can be set for rotational displacement from the fully closed positions and fully open positions, with optional default thresholds (e.g., one rotation). Thus, in some exemplary aspects, for a gate valve, "open" can correspond to a valve being within one full valve stem rotation of the open position; "closed" can correspond to the valve being within one full valve stem rotation of the closed position; and "partially open" can correspond to the valve being between the "open" and "closed" ranges. In some exemplary aspects, for a butterfly valve, "open" can correspond to a valve being within ten degrees of the open position; "closed" can correspond to the valve being within ten degrees of the closed position; and "partially open" can correspond to the valve being between the "open" and "closed" ranges.

Computing Device

FIG. 13 shows a system 1000 including a computing device 1001 for use with the valve position monitoring device 100. In exemplary aspects, the computing device 1001 can be a smart device (e.g., smartphone) or a tablet. Additional examples of computing devices 1001 include personal computers, computing stations (e.g., workstations), and portable computers, such as laptop computers.

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as rotational position data 1007 and/or program modules such as operating system 1005 and rotational position determining software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like.

Any number of program modules may be stored on the mass storage device 1004. An operating system 1005 and rotational position determining software 1006 may be stored on the mass storage device 1004. One or more of the operating system 1005 and rotational position determining software 1006 (or some combination thereof) may comprise program modules and the rotational position determining software 1006. Rotational position data 1007 may also be stored on the mass storage device 1004. Rotational position data 1007 may be stored in any of one or more databases known in the art. The databases may be centralized or distributed across multiple locations within the network 1015.

A user may enter commands and information into the computing device 1001 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 1003 via a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 via an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 via Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014*a,b,c*. A remote computing device 1014*a,b,c* may be a microcontroller, personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014*a,b,c* may be made via a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet.

In some aspects, each of the remote computing devices 1014*a,b,c* can be microcontrollers 140 of different valve position monitoring devices 100. Thus, each of the remote computing devices 1014*a,b,c* can be in communication with the computing device 1001 for providing rotational position data, battery charge data, valve flow data, error (e.g., sensing error) data, or any other data thereto.

Application programs and other executable program components such as the operating system 1005 are shown herein as discrete blocks, although it is recognized that such programs and components may reside at various times in different storage components of the computing device 1001, and are executed by the one or more processors 1003 of the computing device 1001. An implementation of diffuser status display software 1006 may be stored on or sent across some form of computer readable media. Any of the disclosed methods may be performed by processor-executable instructions embodied on computer readable media.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A valve position monitor for determining a position of a valve stem of a valve, the valve position monitor comprising: a housing; a shaft rotatably disposed within the housing, the shaft having a first end; a coupling at the first end of the shaft that is configured to couple to a valve stem; a rotation sensor within the housing that is configured to output a first signal corresponding to a rotational position of the shaft; a transmitter within the housing and in communication with the rotation sensor, wherein the transmitter is configured to transmit a second signal corresponding to the rotational position of the valve stem to a remote receiver; and a power source within the housing and in communication with the transmitter.

Aspect 2: The valve position monitor of aspect 1, wherein the power source is a battery.

Aspect 3: The valve position monitor of aspect 1 or aspect 2, wherein the transmitter is configured transmit a signal corresponding to an amount of charge on the battery.

Aspect 4: The valve position monitor of aspect 3, wherein the transmitter is configured to transmit a signal to the remote receiver upon the amount of charge on the battery dropping below a threshold.

Aspect 5: The valve position monitor of any one of the preceding aspects, wherein the rotation sensor is a rotary encoder.

Aspect 6: The valve position monitor of any one of aspects 1-4, wherein the rotation sensor is a Hall Effect sensor.

Aspect 7: The valve position monitor of any one of the preceding aspects, wherein the transmitter is configured to transmit via at least one of radio frequency (RF), SMS, MMS, or Wi-Fi.

Aspect 8: The valve position monitor of any one of the preceding aspects, further comprising at least one processor and a memory in communication with the at least one processor, wherein memory comprises instructions that, when executed by the at least one processor, cause the at least one processor to: receive the first signal from the rotation sensor corresponding to the rotational position of the valve stem, and convert the signal from the rotation sensor to an angular displacement.

Aspect 9: The valve position monitor of any one of the preceding aspects, further comprising at least one processor and a memory in communication with the at least one processor, wherein memory comprises instructions that, when executed by the at least one processor, cause the at least one processor to: receive a signal from the rotation sensor corresponding to the rotational position of the valve stem, and convert the signal from the rotation sensor to an opening percentage based on at least one calibration setting.

Aspect 10: The valve position monitor of aspect 9, wherein the at least one calibration setting comprises a first value corresponding to a first rotational position of the valve stem when the valve is fully open and a second value corresponding to a second rotational position of the valve stem when the valve is fully closed.

Aspect 11: The valve position monitor of any one of the preceding aspects, wherein the valve position monitor is not configured to receive wireless communication.

Aspect 12: The valve position monitor of any one of the preceding aspects, wherein the transmitter is configured to transmit the rotational position of the valve stem at select spaced intervals.

Aspect 13: The valve position monitor of any one of the preceding aspects, wherein the transmitter is configured to transmit the rotational position of the valve stem upon receiving a request from a remote device.

Aspect 14: The valve position monitor of any one of the preceding aspects, wherein the transmitter is configured to transmit the rotational position of the valve stem upon a change in the rotational position of the valve stem.

Aspect 15: A valve comprising: a valve body; a flow metering body that is movable within the valve body about and between a closed position and a fully open position; a stem coupled to the flow metering body, wherein rotation of the stem is configured to move the flow metering body between the closed position and the fully open position; a rotation sensor that is configured to output a signal corresponding to a rotational position of the valve stem; a transmitter in communication with the rotation sensor, wherein the transmitter is configured to transmit the rotational position of the valve stem to a remote receiver; and a power source in communication with the transmitter.

Aspect 16: The valve of aspect 15, wherein the flow metering body comprises one of a gate and a butterfly valve disc.

Aspect 17: The valve of aspect 15 or aspect 16, further comprising a magnetic sensor that is configured to measure a flow rate of a fluid traveling through the valve body.

Aspect 18: A system comprising: a plurality of valves, each valve comprising: a valve body; a flow metering body that is movable within the valve body about and between a closed position and a fully open position; a stem coupled to the flow metering body, wherein rotation of the stem is configured to move the flow metering body between the closed position and the fully open position; a rotation sensor that is configured to output a signal corresponding to a rotational position of the valve stem; a transmitter in communication with the rotation sensor, wherein the transmitter is configured to transmit a signal corresponding to the rotational position of the valve stem; and a power source in communication with the transmitter; a display device; and a computing device in communication with the transmitter of each valve of the plurality of valves and the display device, wherein the computing device comprises at least one processor and a memory, wherein the memory comprises instructions that, when executed by the at least one processor, cause the at least one processor to: receive the signal corresponding to the rotational position of the valve stem from a valve of the plurality of valves, and display, on the display device, a value corresponding to a relative position of the valve.

Aspect 19: The system of aspect 18, wherein the memory comprises instructions that, when executed by the at least one processor, cause the at least one processor to: convert the signal from the rotation sensor to the relative position of the valve based on at least one calibration setting.

Aspect 20: The system of aspect 18 or aspect 19, further comprising an input device that is in communication with the computing device, wherein the input device is configured to receive the at least one calibration setting, wherein the at least one calibration setting comprises a first value corresponding to a rotational position of the valve stem when the valve is fully open and a second value corresponding to a rotational position of the valve stem when the valve is fully closed.

Although several embodiments of the invention have been disclosed in the foregoing specification and the following appendices, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A valve position monitor for determining a position of a valve stem of a valve of a water transmission system, the valve position monitor comprising:
   a housing that is configured to be received within and non-rotatably coupled to a valve box of the water transmission system;
   a shaft disposed within and rotatable relative to the housing, the shaft having a first end and a second end, wherein the second end comprises a nut configured for engagement of a wrench;
   a square or rectangular receptacle at the first end of the shaft that is configured to receive and couple to a valve stem of the water transmission system;
   a rotation sensor within the housing that is configured to output a first signal corresponding to a rotational position of the shaft;
   a transmitter within the housing and in communication with the rotation sensor, wherein the transmitter is configured to wirelessly transmit a second signal corresponding to the rotational position of the valve stem to a remote receiver, wherein the transmitter is configured to transmit the rotational position of the valve stem at spaced intervals, wherein the valve position monitor is configured to remain in a low power mode when not transmitting data; and
   a battery within the housing and in communication with the transmitter,
   wherein the transmitter is configured to transmit a signal corresponding to an amount of charge on the battery,
   wherein the valve position monitor is configured to be retrofit to the valve of the water transmission system.

2. The valve position monitor of claim 1, wherein the transmitter is configured to transmit a signal to the remote receiver upon the amount of charge on the battery dropping below a threshold.

3. The valve position monitor of claim 1, wherein the rotation sensor is a rotary encoder.

4. The valve position monitor of claim 1, wherein the rotation sensor is a Hall Effect sensor.

5. The valve position monitor of claim 1, wherein the transmitter is configured to transmit via at least one of radio frequency (RF), SMS, MMS, or Wi-Fi.

6. The valve position monitor of claim 1, further comprising at least one processor and a memory in communication with the at least one processor, wherein the memory comprises instructions that, when executed by the at least one processor, cause the at least one processor to:
   receive the first signal from the rotation sensor corresponding to the rotational position of the valve stem, and
   determine, based on the first signal from the rotation sensor, a change in rotational position from a first reference position.

7. A system comprising:
   a plurality of valves, wherein each valve is an isolation valve configured for use in a water transmission system, each valve comprising:
      a valve body;
      a flow metering body that is movable within the valve body about and between a closed position and a fully open position;
      a stem coupled to the flow metering body, wherein rotation of the stem is configured to move the flow metering body between the closed position and the fully open position; and
   a plurality of valve position monitors, wherein each valve position monitor of the plurality of valve position monitors is retrofit to a respective valve of the plurality of valves, wherein each valve position monitor comprises:
      (1) a housing that is configured to be received within and non-rotatably coupled to a valve box of the water transmission system;
      (2) a shaft disposed within and rotatable relative to the housing, the shaft having a first end and a second end, wherein the second end comprises a nut configured for engagement of a wrench;
      (3) a square or rectangular receptacle at the first end of the shaft that receives and couples to the stem of the respective valve;
   a rotation sensor that is configured to detect a position of the valve stem and output a signal corresponding to a rotational position of the valve stem;
   a transmitter in communication with the rotation sensor, wherein the transmitter is configured to wirelessly transmit a signal corresponding to the rotational position of the valve stem, wherein the transmitter is configured to transmit the rotational position of the valve stem at spaced intervals, wherein the valve position monitor is configured to remain in a low power mode when not transmitting data; and
   a battery in communication with the transmitter,
   wherein the transmitter is configured transmit a signal corresponding to an amount of charge on the battery;
   a display device; and
   a computing device in communication with the transmitter of each valve of the plurality of valves and the display device, wherein the computing device comprises at least one processor and a memory, wherein the memory comprises instructions that, when executed by the at least one processor, cause the at least one processor to:
      receive the signal corresponding to the rotational position of the valve stem from a valve of the plurality of valves, and
      display, on the display device, a value corresponding to a relative position of the valve.

8. The valve position monitor of claim 1, further comprising at least one processor and a memory in communication with the at least one processor, wherein the memory comprises instructions that, when executed by the at least one processor, cause the at least one processor to:
   receive a signal from the rotation sensor corresponding to the rotational position of the valve stem, and
   convert the signal from the rotation sensor to an opening percentage based on at least one calibration setting.

9. The valve position monitor of claim 8, wherein the at least one calibration setting comprises a first value corresponding to a first rotational position of the valve stem when the valve is fully open and a second value corresponding to a second rotational position of the valve stem when the valve is fully closed.

10. The valve position monitor of claim 1, wherein the transmitter is configured to transmit the rotational position of the valve stem upon receiving a request from a remote device.

11. The valve position monitor of claim 1, wherein the transmitter is configured to transmit the second signal corresponding to the rotational position of the valve stem in response to a change in the rotational position of the valve stem.

12. The valve position monitor of claim 1, wherein the transmitter is configured to communicate via a cellular network.

13. The valve position monitor of claim 1, wherein the shaft comprises a telescopic extension comprising a plurality of nested members.

14. A valve assembly comprising:
an isolation valve configured for use in a water transmission system, the isolation valve comprising:
a valve body;
a flow metering body that is movable within the valve body about and between a closed position and a fully open position; and
a stem coupled to the flow metering body, wherein rotation of the stem is configured to move the flow metering body between the closed position and the fully open position; and
a rotation sensor that is configured to detect a position of the valve stem and output a signal corresponding to a rotational position of the valve stem;
a valve position monitor that is retrofit to the isolation valve, the valve position monitor comprising:
ii. a housing that is configured to be received within and non-rotatably coupled to a valve box of the water transmission system;
iii. a shaft disposed within and rotatable relative to the housing, the shaft having a first end and a second end, wherein the second end comprises a nut configured for engagement of a wrench;
iv. a square or rectangular receptacle at the first end of the shaft that receives and couples to the stem of the isolation valve;

a transmitter in communication with the rotation sensor, wherein the transmitter is configured to wirelessly transmit the rotational position of the valve stem to a remote receiver, wherein the transmitter is configured to transmit the rotational position of the valve stem at spaced intervals, wherein the valve position monitor is configured to remain in a low power mode when not transmitting data; and
a battery in communication with the transmitter,
wherein the transmitter is configured transmit a signal corresponding to an amount of charge on the battery.

15. The valve assembly of claim 14, wherein the flow metering body comprises one of a gate and a butterfly valve disc.

16. The valve assembly of claim 14, further comprising a magnetic sensor that is configured to measure a flow rate of a fluid traveling through the valve body.

17. The system of claim 7, wherein the memory comprises instructions that, when executed by the at least one processor, cause the at least one processor to:
compare the rotational position of the shaft relative to a reference position.

18. The system of claim 7, wherein the memory comprises instructions that, when executed by the at least one processor, cause the at least one processor to: convert the signal from the rotation sensor to the relative position of the valve based on at least one calibration setting.

19. The system of claim 7, further comprising an input device that is in communication with
the computing device, wherein the input device is configured to receive the at least one calibration setting, wherein the at least one calibration setting comprises a first value corresponding to a rotational position of the valve stem when the valve is fully open and a second value corresponding to a rotational position of the valve stem when the valve is fully closed.

* * * * *